(12) United States Patent
Kawahara

(10) Patent No.: US 9,605,729 B2
(45) Date of Patent: Mar. 28, 2017

(54) LOCK-UP DEVICE FOR TORQUE CONVERTER

(71) Applicant: EXEDY Corporation, Neyagawa-shi, Osaka (JP)

(72) Inventor: Yuki Kawahara, Neyagawa (JP)

(73) Assignee: EXEDY Corporation, Osaka (JP)

( * ) Notice: Subject to any disclaimer, the term of this patent is extended or adjusted under 35 U.S.C. 154(b) by 36 days.

(21) Appl. No.: 14/652,650

(22) PCT Filed: Feb. 6, 2014

(86) PCT No.: PCT/JP2014/052717
§ 371 (c)(1),
(2) Date: Jun. 16, 2015

(87) PCT Pub. No.: WO2014/123174
PCT Pub. Date: Aug. 14, 2014

(65) Prior Publication Data
US 2015/0337920 A1    Nov. 26, 2015

(30) Foreign Application Priority Data

Feb. 6, 2013   (JP) ................................ 2013-020977

(51) Int. Cl.
*F16H 45/02* (2006.01)
*F16F 15/131* (2006.01)
(Continued)

(52) U.S. Cl.
CPC .. *F16F 15/13128* (2013.01); *F16F 15/13484* (2013.01); *F16F 15/1428* (2013.01);
(Continued)

(58) Field of Classification Search
CPC ............... F16H 45/02; F16H 15/13123; F16H 15/13484; F16H 15/1428; F16H 2045/0205; F16H 2045/0226; F16H 2045/0294
See application file for complete search history.

(56) References Cited

U.S. PATENT DOCUMENTS 5,086,892 A * 2/1992 Schierling ................ F16F 7/10
192/3.25
5,713,442 A 2/1998 Murata et al.
(Continued)

FOREIGN PATENT DOCUMENTS

CN    101883933 A    11/2010
DE    102004004176 A1    8/2005
(Continued)

OTHER PUBLICATIONS

Office Action of the corresponding Chinese Patent Application No. 201480005120.9, dated Dec. 7, 2016.

*Primary Examiner* — Jacob S Scott
*Assistant Examiner* — Tinh Dang
(74) *Attorney, Agent, or Firm* — Global IP Counselors, LLP

(57) ABSTRACT

Occurrence of secondary resonance in a dynamic damper device of a lock-up device is inhibited to improve effectiveness of the dynamic damper device. The lock-up device includes a drive plate, a driven plate coupled to a turbine, an intermediate member, a plurality of outer peripheral side and inner peripheral side torsion springs, and a dynamic damper device. The intermediate member is disposed between the outer peripheral side torsion springs and the inner peripheral side torsion springs. The outer peripheral side torsion springs elastically couple the drive plate and the intermediate member in a rotational direction. The inner peripheral side torsion springs elastically couple the intermediate mem-
(Continued)

ber and the driven plate in the rotational direction. The dynamic damper device includes an inertia ring coupled to the intermediate member.

20 Claims, 12 Drawing Sheets

(51) Int. Cl.
*F16F 15/134* (2006.01)
*F16F 15/14* (2006.01)

(52) U.S. Cl.
CPC ..... *F16H 45/02* (2013.01); *F16H 2045/0205* (2013.01); *F16H 2045/0226* (2013.01); *F16H 2045/0294* (2013.01)

(56) References Cited

U.S. PATENT DOCUMENTS

| 6,026,940 | A | 2/2000 | Sudau |
| 8,161,740 | B2* | 4/2012 | Krause ................ F16F 15/145 |
| | | | 192/30 V |
| 2009/0125202 | A1 | 5/2009 | Swank et al. |
| 2011/0031083 | A1* | 2/2011 | Matsuoka ............... F16H 45/02 |
| | | | 192/3.29 |
| 2011/0192692 | A1 | 8/2011 | Werner et al. |
| 2012/0080281 | A1 | 4/2012 | Takikawa et al. |
| 2012/0080282 | A1 | 4/2012 | Takikawa et al. |
| 2013/0206529 | A1 | 8/2013 | Tomiyama |
| 2015/0345565 | A1* | 12/2015 | Tomiyama ............... F16F 15/12 |
| | | | 464/68.8 |

FOREIGN PATENT DOCUMENTS

| EP | 1464873 B1 | 9/2010 |
| JP | 09-264399 A | 10/1997 |
| JP | 2009-115112 A | 5/2009 |
| JP | 2009-156270 A | 7/2009 |
| JP | 2011-503474 A | 1/2011 |
| JP | 2012-506004 A | 3/2012 |
| JP | 2012-077823 A | 4/2012 |
| JP | 2012-077826 A | 4/2012 |
| JP | 2012-087856 A | 5/2012 |
| WO | 2004-018897 A1 | 3/2004 |

* cited by examiner

FIG. 11A <NORMAL CONDITION>
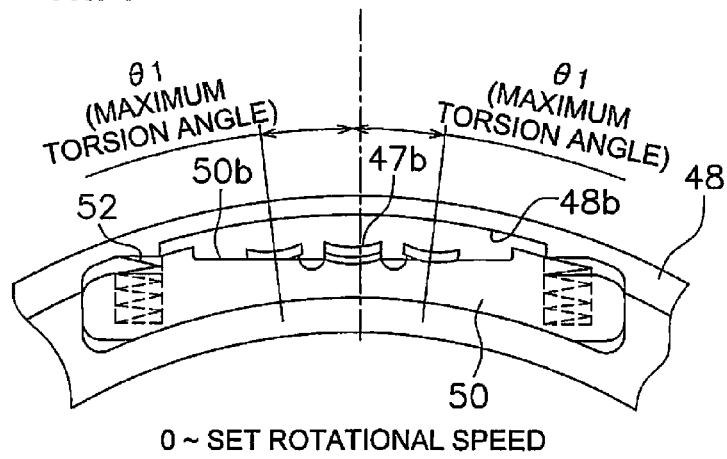
0 ~ SET ROTATIONAL SPEED
FIG. 11B <ATTENUATED CONDITION>
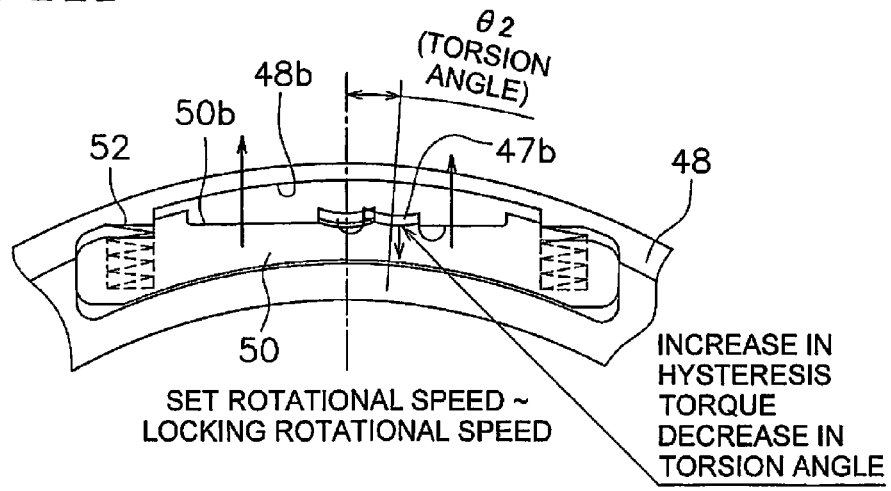
SET ROTATIONAL SPEED ~ LOCKING ROTATIONAL SPEED
INCREASE IN HYSTERESIS TORQUE DECREASE IN TORSION ANGLE
FIG. 11C <LOCKED CONDITION>
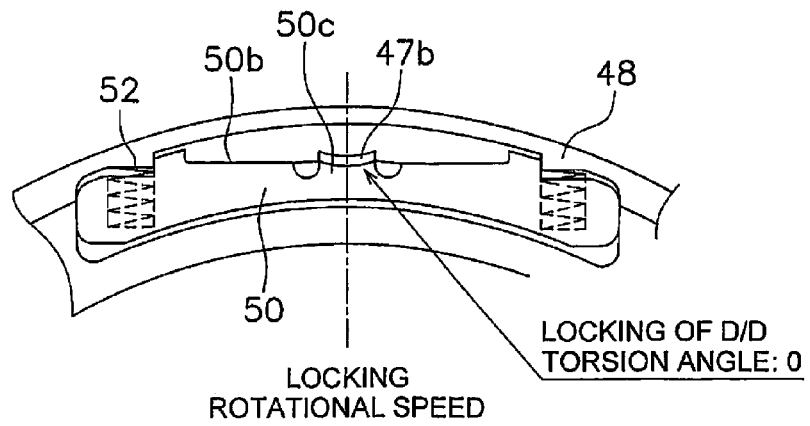
LOCKING ROTATIONAL SPEED
LOCKING OF D/D TORSION ANGLE: 0

LOCK-UP DEVICE FOR TORQUE CONVERTER

CROSS-REFERENCE TO RELATED APPLICATIONS

This application is a U.S. National stage application of International Application No. PCT/JP2014/052717, filed Feb. 6, 2014, which claims priority to Japanese Patent Application No. 2013-020977, filed in Japan on Feb. 6, 2013, the entire contents of which are hereby incorporated by reference.

BACKGROUND

Field of Invention

The present invention relates to a lock-up device, particularly to a lock-up device for a torque converter, which is disposed between a front cover coupled to an engine-side member and a turbine hub coupled to a transmission.

Background Information

A torque converter is equipped with a lock-up device to reduce fuel consumption. The lock-up device is disposed in a space produced between a front cover and a turbine, and is configured to mechanically couple the front cover and the turbine to directly transmit a torque therebetween.

In general, the lock-up device includes a piston, to which a friction member is mounted as a clutch portion, and a damper mechanism. The piston is pressed onto the front cover by the action of hydraulic pressure and a torque is transmitted to the piston from the front cover through the friction member. The damper mechanism includes an output-side member coupled to the turbine and a plurality of torsion springs for elastically coupling the piston and the output-side member. Furthermore, the torque transmitted to the piston is transmitted to the output-side member through the plural torsion springs, and is further transmitted to the turbine.

Incidentally, Japanese Laid-open Patent Application Publication No. 2012-87856 describes a lock-up device including a dynamic damper mechanism in which an inertia member is mounted to the output-side member to inhibit variation in engine rotation. In the lock-up device, the inertia member is mounted to the output member fixed to the turbine to be rotatable relative thereto. Furthermore, torsion springs are mounted as elastic members between the output member and the inertia member.

Moreover, in the device of Japanese Laid-open Patent Application Publication No. 2012-87856, a hysteresis torque generating mechanism is mounted between the output member and the inertia member. The hysteresis torque generating mechanism is configured to make the magnitude of hysteresis torque vary depending on rotational speed ranges, and thereby, reduce variation in output-side rotational speed over wide rotational speed ranges.

SUMMARY

In the device described in Japanese Laid-open Patent Application Publication No. 2012-87856, a first hysteresis torque is configured to be generated in a low rotational speed range, whereas a second hysteresis torque larger than the first hysteresis torque is configured to be generated in a middle to high rotational speed ranges. Additionally, in the device, the inertia member is configured to be locked with respect to the output member to prevent relative rotation between the both members in the high rotational speed range.

It is herein required to accurately set a rotational speed at which relative rotation between the output member and the inertia member is prevented (a locking rotational speed) to exert an effect of attenuating variation in rotation by the dynamic damper device as effectively as possible. When the locking rotational speed varies, a rotational speed range in which variation in rotation is large is inevitably used in characteristics of variation in rotation. Hence, the effect of attenuating variation in rotation cannot be effectively exerted.

It is an object of the present invention to exert an effect of a dynamic damper device as effectively as possible in a lock-up device equipped with the dynamic damper device.

A lock-up device for a torque converter according to an aspect of the present invention is a device mounted between a front cover coupled to an engine-side member and a turbine coupled to a transmission, and includes an input rotary member into which a power is inputted, an output rotary member, a plurality of elastic members, an intermediate member and a dynamic damper device. The output rotary member is rotatable relative to the input rotary member and is coupled to the turbine. The plurality of elastic members elastically couple the input rotary member and the output rotary member in a rotational direction. The intermediate member is rotatable relative to the input rotary member and the output rotary member, and causes at least two of the plurality of elastic members to act in a series-like manner. The dynamic damper device includes an inertia member coupled to the intermediate member.

In an aspect of the present device, the power from the front cover is inputted into the input rotary member, and is transmitted to the turbine through the plurality of elastic members and the output rotary member. At this time, at least two of the plurality of elastic members are caused to act in a series-like manner by the intermediate member. Furthermore, the dynamic damper device is mounted to the intermediate member, and variation in rotation can be inhibited by the dynamic damper device.

The effect of action by the dynamic damper device herein depends on the rotational speed to be determined in accordance with the specification of the dynamic damper device (e.g., a locking rotational speed at which the dynamic damper mechanism is inevitably disabled). Furthermore, chances are that the preliminarily determined rotational speed varies due to manufacturing errors in constituent members of the dynamic damper device and so forth.

In view of the above, an aspect of the present invention employs the construction that the dynamic damper device is coupled to the intermediate member and the plurality of elastic members are disposed between the dynamic damper device and the output rotary member. With the construction, even when manufacturing errors occur in the constituent members of the dynamic damper device, variation in rotation can be effectively inhibited.

Preferably, the plurality of elastic members include a plurality of first elastic members and a plurality of second elastic members. The plurality of first elastic members elastically couple the input rotary member and the intermediate member in the rotational direction. The plurality of second elastic members are configured to act with the plurality of first elastic members in a series-like manner through the intermediate member and elastically couple the intermediate member and the output rotary member in the rotational direction.

Preferably, the plurality of first elastic members are disposed on an outer peripheral side of the plurality of second elastic members.

Preferably, the lock-up device further includes a clutch portion that is configured to transmit and block the power between the front cover and the input rotary member.

Preferably, the dynamic damper device includes a hysteresis torque generating mechanism that is configured to generate a first hysteresis torque in a low rotational speed range and generate a second hysteresis torque larger than the first hysteresis torque in middle to high rotational speed ranges.

Where the dynamic damper device includes the hysteresis torque generating mechanism, the characteristics of variation in rotational speed of the output rotary member vary depending on the magnitude of hysteresis torque.

Specifically, when the magnitude of hysteresis torque of the dynamic damper device is small, variation in rotational speed of the output rotary member decreases in the low rotational speed range. Contrarily, when the magnitude of hysteresis torque of the dynamic damper device is large, variation in rotational speed of the output rotary member decreases in the middle rotational speed range.

In view of the above, an aspect of the present invention is configured to increase the hysteresis torque in the dynamic damper device in accordance with increase in rotational speed. Hence, variation in rotational speed on the output side can be inhibited over wide rotational speed ranges. Consequently, even when a lock-up rotational speed is set low, variation in rotational speed can be inhibited over wide rotational speed ranges by attaching the present dynamic damper device to the lock-up device.

Preferably, at least two of the plurality of first elastic members are configured to act in a series-like manner. In the construction, a torsion angle can be enlarged and vibration can be inhibited as much as possible.

Preferably, at least two of the plurality of second elastic members are configured to act in a series-like manner. In the construction, the torsion angle can be further enlarged, and similarly to the above, vibration can be inhibited as much as possible.

It should be noted that when the torsion angle can be appropriately enlarged, occurrence of secondary resonance can be inhibited in the middle rotational speed range and this can lead to disuse or elimination of the hysteresis torque generating mechanism.

Preferably, the hysteresis torque generating mechanism includes a slider and a contact member. The slider is configured to be rotated together with the inertia member, is movable with respect to the inertia member in a radial direction, and has a slide surface extending in the rotational direction. The contact member is configured to be rotated together with the intermediate member, is configured to make contact with the slide surface of the slider such that a range of a torsion angle relative to the inertia member is restricted to a first angular range in the low rotational speed range, is configured to make contact with the slide surface of the slider such that the range of the torsion angle relative to the inertia member is restricted to a second angular range narrower than the first angular range in the middle rotational speed range including a rotational speed higher than a rotational speed in the low rotational speed range, and is configured to make contact with the slide surface of the slider such that torsion relative to the inertia member is prevented in the high rotational speed range including a rotational speed higher than the rotational speed in the middle rotational speed range.

The slider may have a lock part to which the contact member is fitted and that is formed on a middle part of the slide surface in the rotational direction.

In the aforementioned construction, when the rotational speed reaches the high rotational speed and the range of the relative torsion angle between the contact member and the inertia member is narrowed, the contact member is finally fitted to the lock part of the slider, and relative rotation between the both members is prevented such that the hysteresis torque becomes infinite.

The lock-up device may further include an output side dynamic damper device that is coupled to the turbine and includes an inertia member.

In such a construction, variation in rotation of the output rotary member can be inhibited as much as possible by the output side dynamic damper device.

The dynamic damper device is fixed to the intermediate member by a rivet.

The dynamic damper device may be coupled to the intermediate member on an outer peripheral side of the plurality of second elastic members.

The output side dynamic damper device may be coupled to the turbine on an inner peripheral side of the plurality of second elastic members.

According to an aspect of the present invention as described above, in a lock-up device for a torque converter, it is possible to exert an effect of a dynamic damper device as effectively as possible by avoiding occurrence of secondary resonance in the dynamic damper device, inhibit variation in rotation, and especially, achieve low fuel consumption.

BRIEF DESCRIPTION OF THE DRAWINGS

FIG. 11A is a diagram for explaining an action of a hysteresis torque generating mechanism according to the first exemplary embodiment in which a slider is in a normal condition.

FIG. 11B is a diagram for explaining an action of a hysteresis torque generating mechanism according to the first exemplary embodiment in which a slider is in an attenuated condition.

FIG. 11C is a diagram for explaining an action of a hysteresis torque generating mechanism according to the first exemplary embodiment in which a slider is in a locked condition.

DESCRIPTION OF EXEMPLARY EMBODIMENTS

First Exemplary Embodiment

Figure 1:
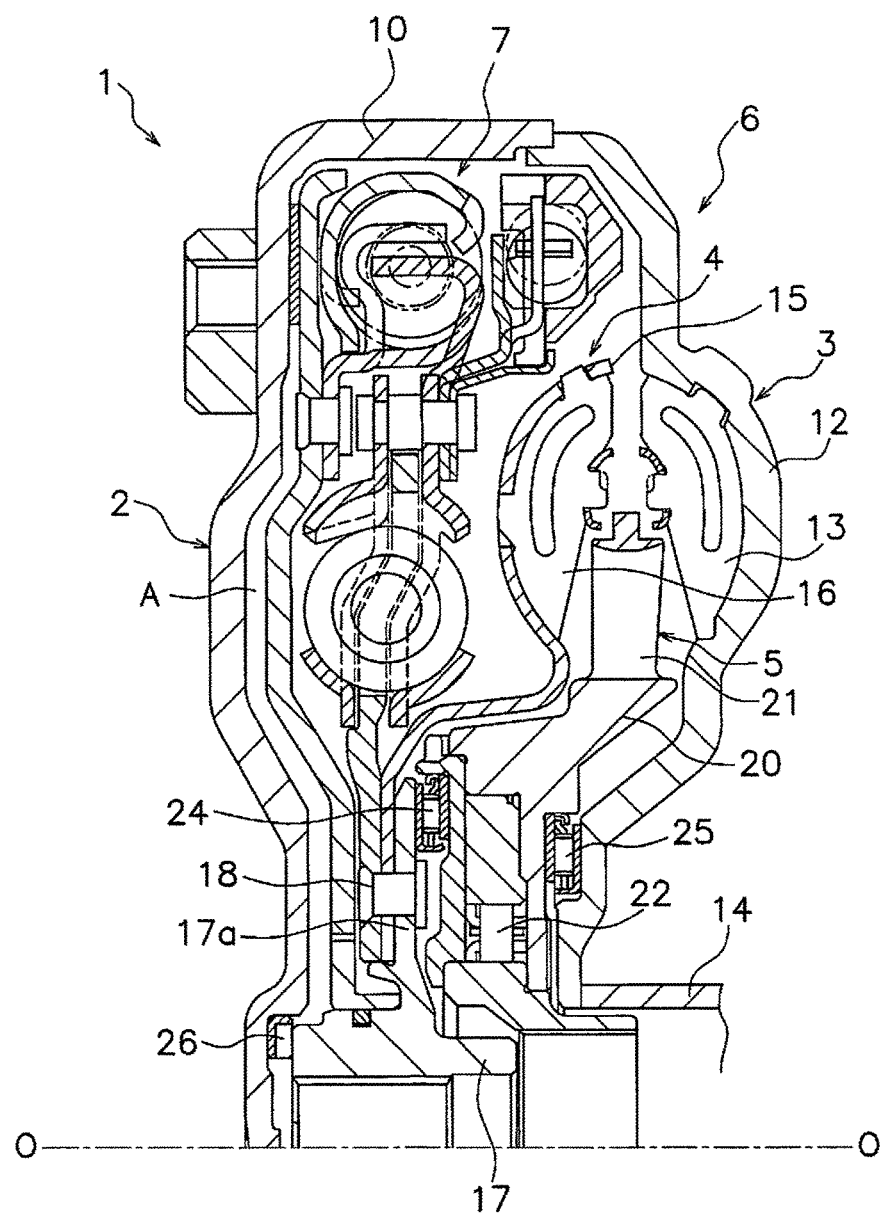
FIG. 1 is a cross-sectional view of a construction of a torque converter equipped with a lock-up device according to a first exemplary embodiment of the present invention.
Figure 2:
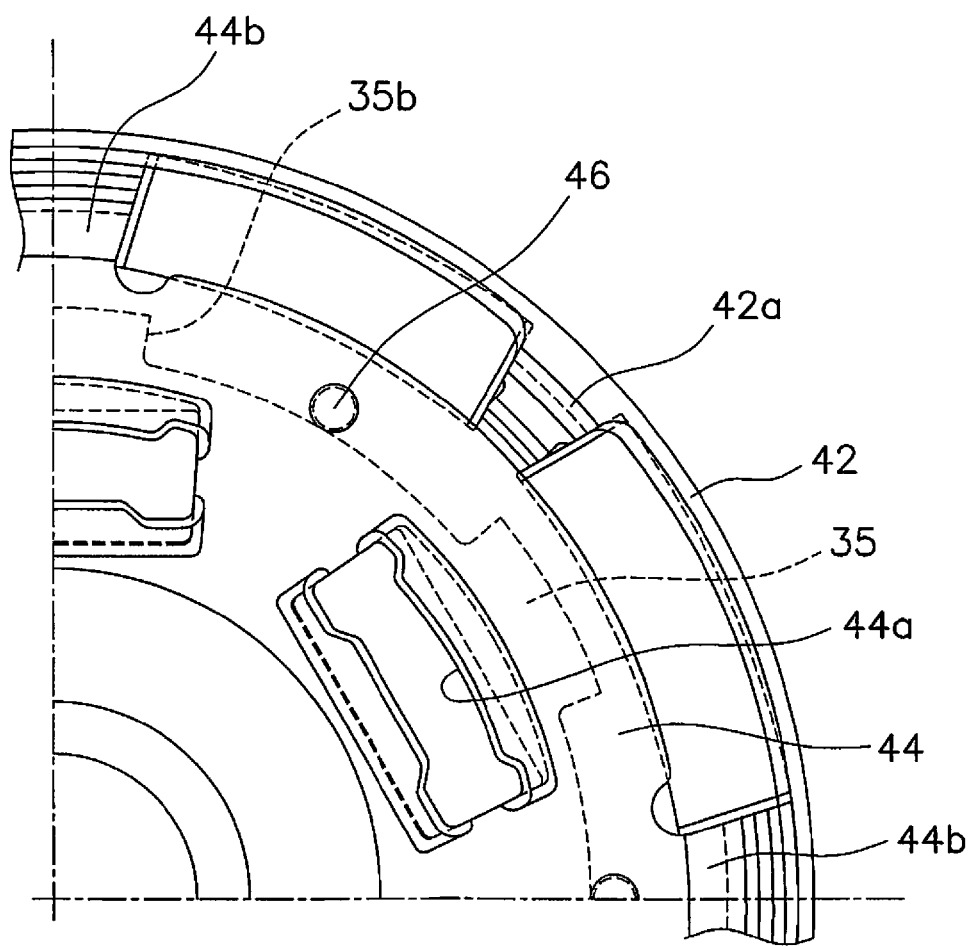
FIG. 2 is a partial front view of FIG. 1.

FIG. 1 is a partial cross-sectional view of a torque converter 1 equipped with a lock-up device according to a first exemplary embodiment of the present invention. In FIG. 1, an engine (not shown in the drawing) is disposed on the left side, whereas a transmission (not shown in the drawing) is disposed on the right side. FIG. 2 is a partial front view of the lock-up device. In FIG. 2, torsion springs as elastic members and a dynamic damper device are not illustrated. It should be noted that a line O-O depicted in FIG. 1 indicates a rotational axis of the torque converter and the lock-up device.

Entire Construction of Torque Converter

The torque converter 1 is a device for transmitting a torque from an engine-side crankshaft (not shown in the drawings) to an input shaft of the transmission, and includes a front cover 2 fixed to an input-side member, a torque converter body 6 composed of three types of vane wheels (an impeller 3, a turbine 4 and a stator 5), and a lock-up device 7.

The front cover 2 is a disc-shaped member, and an outer peripheral tubular part 10 is formed on the outer peripheral part of the front cover 2 to protrude axially toward the transmission. The impeller 3 is composed of an impeller shell 12 fixed to the outer peripheral tubular part 10 of the front cover 2 by welding, a plurality of impeller blades 13 fixed to the inside of the impeller shell 12, and a tubular impeller hub 14 disposed on the inner peripheral side of the impeller shell 12.

The turbine 4 is disposed within a fluid chamber to be opposed to the impeller 3. The turbine 4 is composed of a turbine shell 15, a plurality of turbine blades 16 fixed to the turbine shell 15, and a turbine hub 17 fixed to the inner peripheral part of the turbine shell 15. The turbine hub 17 has a flange 17a extending to the outer peripheral side, and the inner peripheral part of the turbine shell 15 is fixed to the flange 17a by a plurality of rivets 18. Furthermore, the input shaft of the transmission (not shown in the drawings) is spline-coupled to the inner peripheral part of the turbine hub 17.

The stator 5 is a mechanism for regulating the flow of operating oil returning from the turbine 4 to the impeller 3, and is disposed between the inner peripheral part of the impeller 3 and that of the turbine 4. The stator 5 is mainly composed of a stator carrier 20 and a plurality of stator blades 21 mounted to the outer peripheral surface of the stator carrier 20. The stator carrier 20 is supported by a stationary shaft (not shown in the drawings) through a one-way clutch 22. It should be noted that thrust bearings 24 and 25 are mounted on the both sides of the stator carrier 20 in the axial direction. Furthermore, a thrust washer 26 is mounted between the front cover 2 and the turbine hub 17.

Lock-Up Device 7

Figure 3:
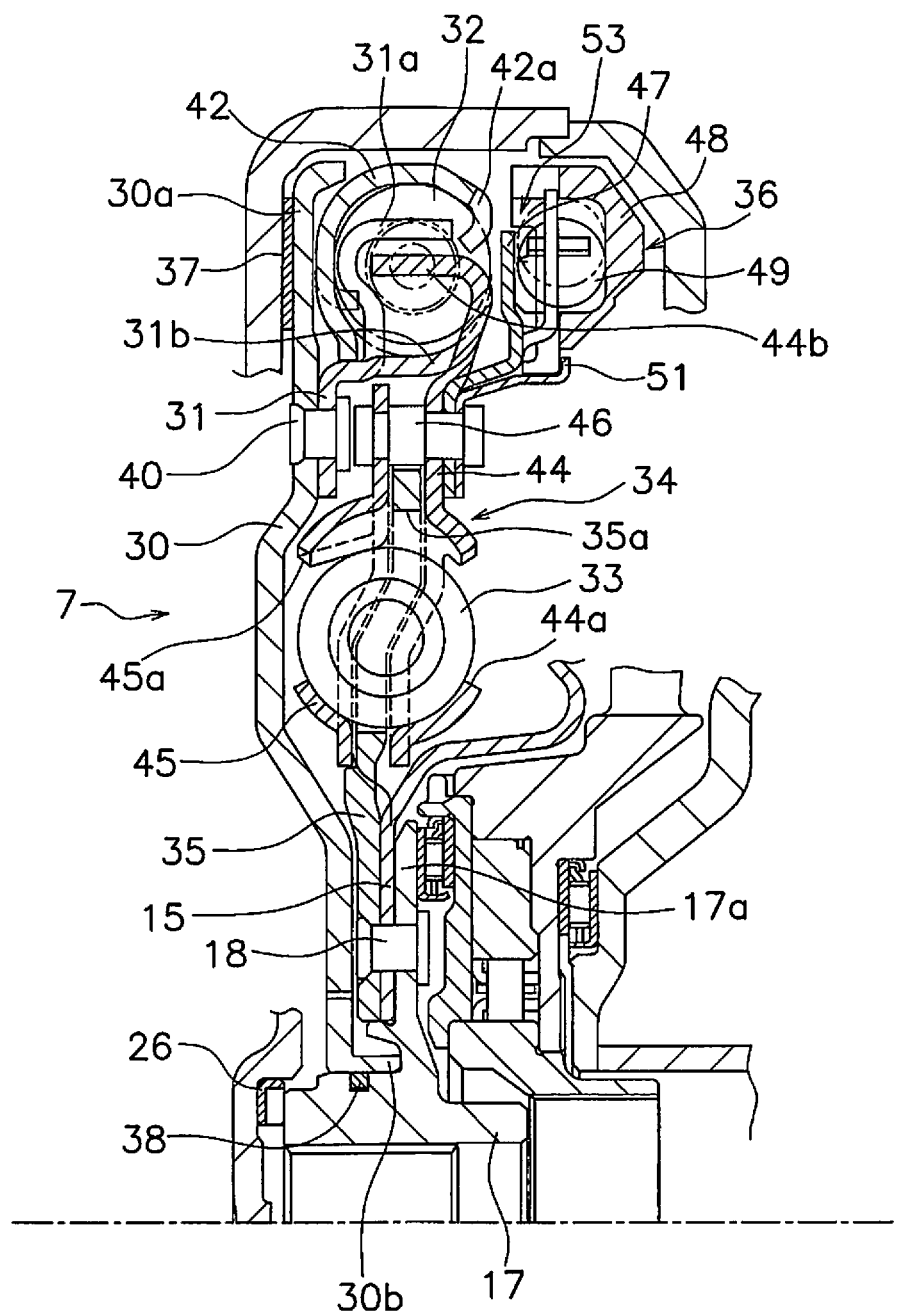
FIG. 3 is a diagram of the lock-up device according to the first exemplary embodiment extracted from the entire construction.

FIG. 3 shows the lock-up device 7 extracted from FIG. 1. The lock-up device 7 is disposed in an annular space produced between the front cover 2 and the turbine 4. The lock-up device 7 mainly includes a piston 30, a drive plate 31, a plurality of outer peripheral side torsion springs 32, a plurality of inner peripheral side torsion springs 33, an intermediate member 34 coupling the outer peripheral side torsion springs 32 and the inner peripheral side torsion springs 33 to make both types of torsion springs act in a series-like manner, a driven plate 35 and a dynamic damper device 36. Herein, an input rotary member is composed of the piston 30 and the drive plate 31, whereas an output rotary member is composed of the driven plate 35.

Piston 30

The piston 30 is a disc-shaped plate member and is disposed to divide a space produced between the front cover 2 and the turbine 4 into two spaces in the axial direction. The outer peripheral part of the piston 30 is formed as a flat friction coupling part 30a, and a friction facing (a clutch portion) 37 is mounted to the axially engine side of the friction coupling part 30a. The front cover 2 has a flat friction surface formed in opposition to the friction facing 37. Furthermore, an inner peripheral tubular part 30b is formed on the inner peripheral edge of the piston 30 to extend axially toward the transmission. The inner peripheral surface of the inner peripheral tubular part 30b is supported by the outer peripheral surface of the turbine hub 17 to be movable in both the axial and rotational directions with respect thereto. It should be noted that, while the tip end of the inner peripheral tubular part 30b contacts a part of the turbine hub 17, the piston 30 is restricted from moving axially toward the transmission from the contact position. A seal ring 38 is mounted between the inner peripheral tubular part 30b and the outer peripheral surface of the turbine hub 17.

With the aforementioned construction, a space A (see FIG. 1) is produced between the front cover 2 and the piston 30. The outer peripheral region of the space A is blocked while the friction facing 37 contacts the front cover 2, whereas the inner peripheral region of the space A communicates with an oil path formed in the input shaft through a groove formed on the thrust washer 26.

Drive Plate 31

As shown in FIG. 3, the drive plate 31 is an annular member made of sheet metal, and is disposed axially on the transmission side of the friction coupling part 30a of the piston 30. The inner peripheral part of the drive plate 31 is fixed to the piston 30 by a plurality of rivets 40. The outer peripheral part of the drive plate 31 has a plurality of engaging parts 31a extending axially toward the transmission. The plurality of engaging parts 31a are formed to be circumferentially aligned at predetermined intervals, and support the end surfaces of the outer peripheral side torsion springs 32. Furthermore, a support part 31b is formed on the outer peripheral side of the piston attached part of the drive plate 31 to extend axially toward the transmission. The inner peripheral side parts of the outer peripheral side torsion springs 32 are supported by the support part 31b.

Outer Peripheral Side Torsion Springs 32

Each of the plurality of outer peripheral side torsion springs 32 is composed of a combination of a large coil spring and a small coil spring that is inserted into the interior of the large coil spring and has a spring length shorter than that of the large coil spring. As an example, a total of eight outer peripheral side torsion springs 32, two of which compose one set, are herein provided and a float member 42 is provided for making two outer peripheral side torsion springs 32 in each set act in series.

The float member 42 is an annular member having a C-shaped cross-section, and is disposed on the radially outer side of the support part 31*b* of the drive plate 31. The float member 42 is disposed to be rotatable relative to the drive plate 31, and the outer peripheral part thereof supports the outer peripheral parts of the outer peripheral side torsion springs 32. The outer peripheral side torsion springs 32 are restricted from jumping out to the outer peripheral side by the float member 42. The axial transmission side tip ends 42*a* of the float member 42 bend to both the inner peripheral and engine sides, and each of the bent parts 42*a* of the tip ends is inserted between the outer peripheral side torsion springs 42 in one set. Both of the circumferential end surfaces of each bent part 42*a* make contact with the end surfaces of the relevant outer peripheral side torsion springs 32.

As described above, the plurality of outer peripheral side torsion springs 32 are arranged such that both of the circumferential ends of one set of the outer peripheral side torsion springs 32 are supported by the engaging parts 31*a* of the drive plate 31, and each bent part 42*a* of the float member 42 is inserted into the intermediate part of one set of the outer peripheral side torsion springs 32. Furthermore, the outer peripheral parts of the outer peripheral side torsion springs 32 are supported by the outer peripheral part of the float member 42.

Intermediate Member 34

As shown in FIG. 3, the intermediate member 34 is composed of a first plate 44 and a second plate 45. The first and second plates 44 and 45 are annular and disc-shaped members disposed between the piston 30 and the turbine shell 15. The first and second plates 44 and 45 are disposed axially at an interval. The first plate 44 is disposed axially on the transmission side, whereas the second plate 45 is disposed axially on the engine side. The first and second plates 44 and 45 are coupled at the outer peripheral parts thereof by a plurality of stop pins 46 to be axially immovable and be non-rotatable relative to each other. Each of the first and second plates 44 and 45 has window parts 44*a*, 45*a* axially penetrating therethrough. As shown in FIG. 2, each window part 44*a*, 45*a* has a circumferentially elongated shape, and has cut-and-raised parts that are formed on the inner and outer peripheral parts thereof to be axially cut and raised.

Moreover, a plurality of engaging parts 44*b* are formed on the outer peripheral end of the first plate 44 to extend to the outer peripheral side torsion springs 32. The plurality of engaging parts 44*b* are formed by bending the tip end of the first plate 44 axially toward the engine. The plurality of engaging parts 44*b* are circumferentially disposed at predetermined intervals, and each set of the outer peripheral side torsion springs 32 acting in series is disposed between two engaging parts 44*b*.

Inner Peripheral Side Torsion Springs 33

Each of the plurality of inner peripheral side torsion springs 33 is composed of a combination of a large coil spring and a small coil spring that is inserted into the interior of the large coil spring and has the same spring length as the large coil spring. Each inner peripheral side torsion spring 33 is disposed within the window parts 44*a* and 45*a* of both plates 44 and 45 of the intermediate member 34. Additionally, each inner peripheral side torsion spring 33 is supported at both circumferential ends thereof and both radial ends thereof by the window parts 44*a* and 45*a*. Furthermore, each inner peripheral side torsion spring 33 is restricted from axially jumping out by the cut-and-raised parts of the window parts 44*a* and 45*a*.

Driven Plate 35

The driven plate 35 is an annular disc-shaped member, and is fixed at the inner peripheral part thereof to the flange 17*a* of the turbine hub 17 together with the turbine shell 15 by the rivets 18. The driven plate 35 is disposed between the first plate 44 and the second plate 45 to be rotatable relative to both plates 44 and 45. Additionally, window holes 35*a* are bored in the outer peripheral part of the driven plate 35 to be aligned with the window parts 44*a* and 45*a* of the first and second plates 44 and 45. The window holes 35*a* are axially penetrating holes, and the inner peripheral side torsion springs 33 are disposed in the window holes 35*a*. Furthermore, as depicted with a broken line in FIG. 2, a plurality of circumferentially elongated cutouts 35*b* are formed in the outer peripheral part of the driven plate 35. Additionally, the stop pins 46 axially penetrate the cutouts 35*b*. Therefore, the driven plate 35 and both plates 44 and 45 composing the intermediate member 34 are rotatable relative to each other within an angular range in which each cutout 35*b* is formed.

Dynamic Damper Device 36

Figure 4:
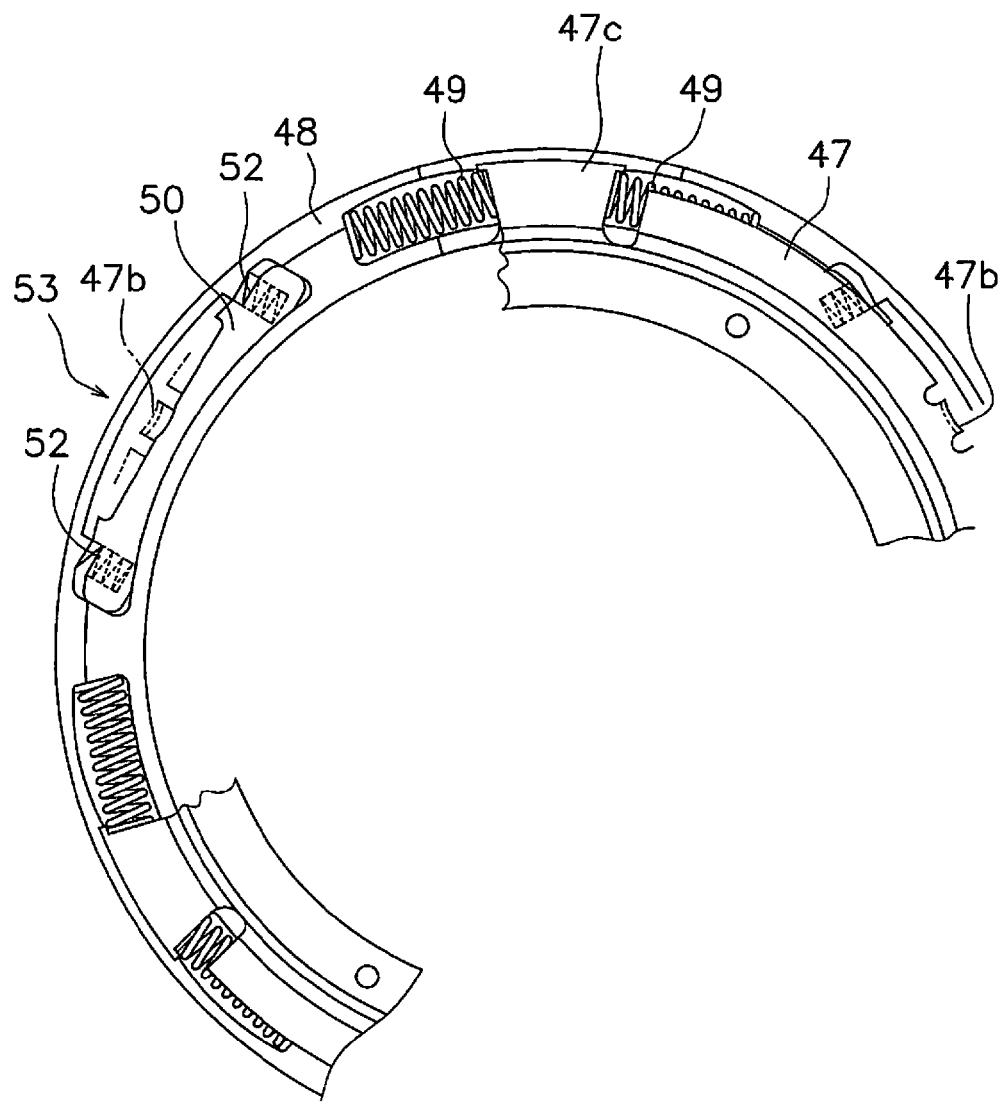
FIG. 4 is a front view of the lock-up device in FIG. 3.

As shown in FIGS. 3 and 4, the dynamic damper device 36 includes a damper plate 47, an inertia ring 48, a plurality of torsion springs 49, a plurality of sliders 50, a side plate 51 and springs 52. It should be noted that FIG. 4 is a front view of the dynamic damper device 36 seen from the engine side. Furthermore, a hysteresis torque generating mechanism 53 is composed of part of the damper plate 47, the plurality of sliders 50 and the springs 52, although detailed explanation thereof will be described below.

Figure 5:
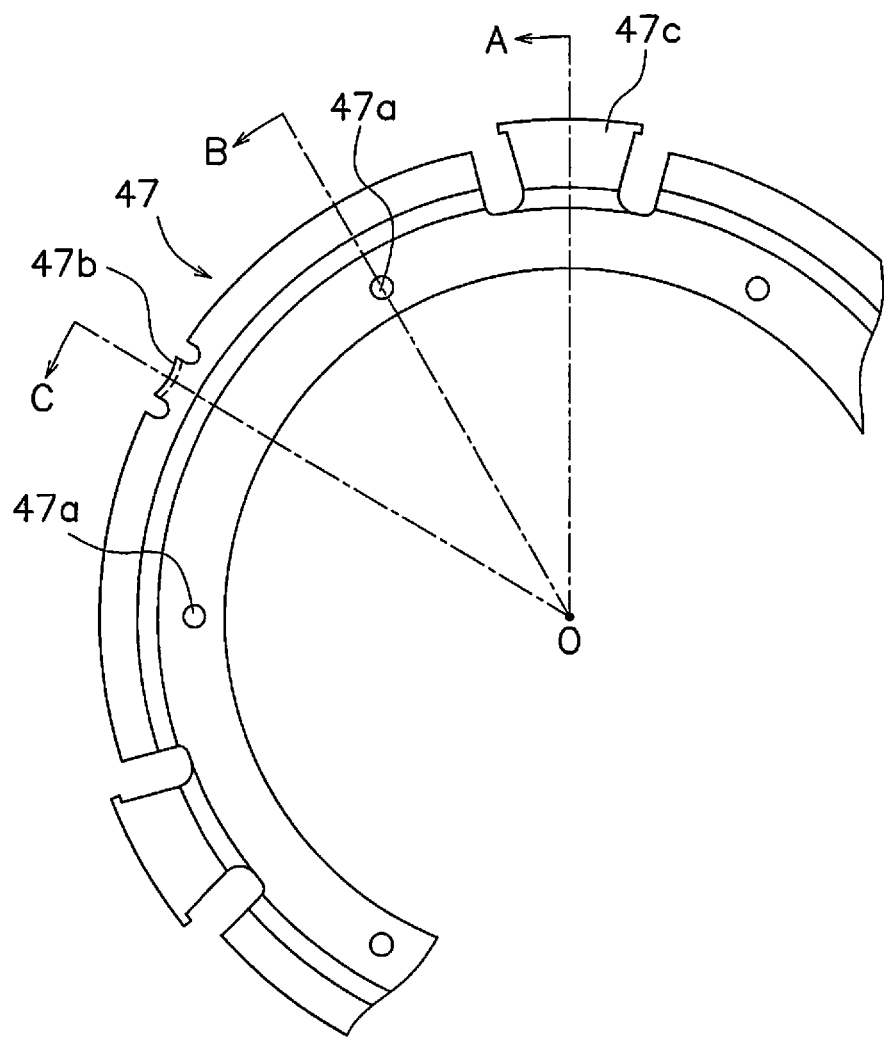
FIG. 5 is a front view of a damper plate composing a part of a dynamic damper device in FIG. 3.
Figure 6C:
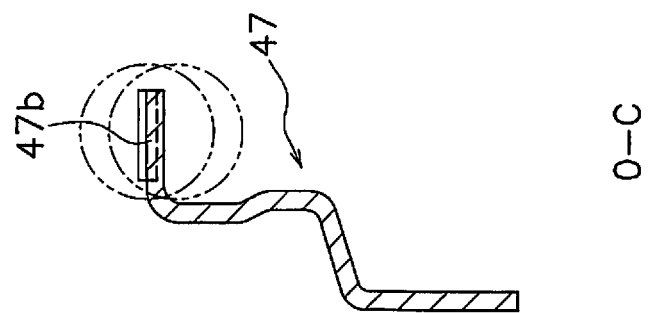
FIG. 6C is a cross-sectional view of FIG. 5 taken along line O-C.
Figure 6B:
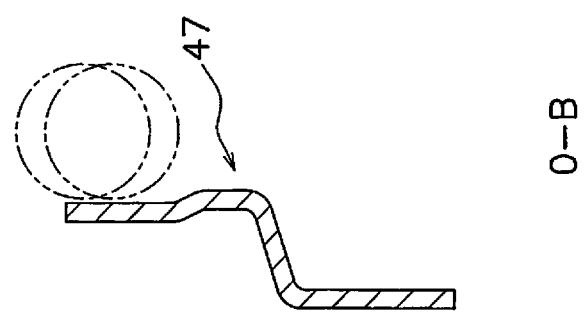
FIG. 6B is a cross-sectional view of FIG. 5 taken along line O-B.
Figure 6A:
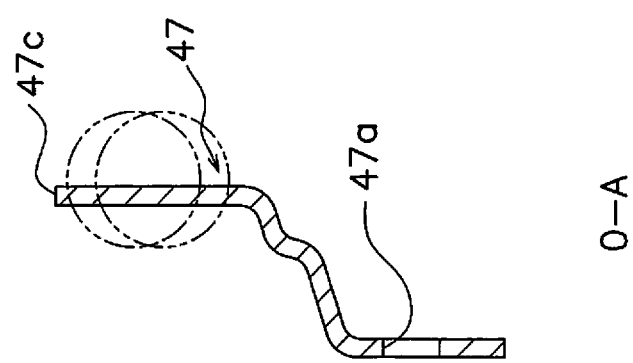
FIG. 6A is a cross-sectional view of FIG. 5 taken along line O-A.

FIG. 5 shows a partial front view of the damper plate 47, whereas FIGS. 6A to 6C show cross-sections of FIG. 5 respectively taken along lines O-A, O-B and O-C. The damper plate 47 is an annularly formed disc member, and has rivet holes 47*a* in the inner peripheral end thereof. As shown in FIG. 3, the inner peripheral end of the damper plate 47 is fixed to the first plate 44 composing a part of the intermediate member 34 by the stop pins 46 penetrating the rivet holes 47*a*. The outer peripheral end of the damper plate 47 has a plurality of pawls 47*b* (contact members) and a plurality of engaging parts 47*c*. As shown in FIG. 6C, the pawls 47*b* are formed by bending the outer peripheral end toward the transmission. As shown in FIG. 6A, the engaging parts 47*c* are formed to be axially displaced toward the transmission more than the pawls 47*b*. The pawls 47*b* and the engaging parts 47*c* are circumferentially disposed in an alternating arrangement.

Figure 7:
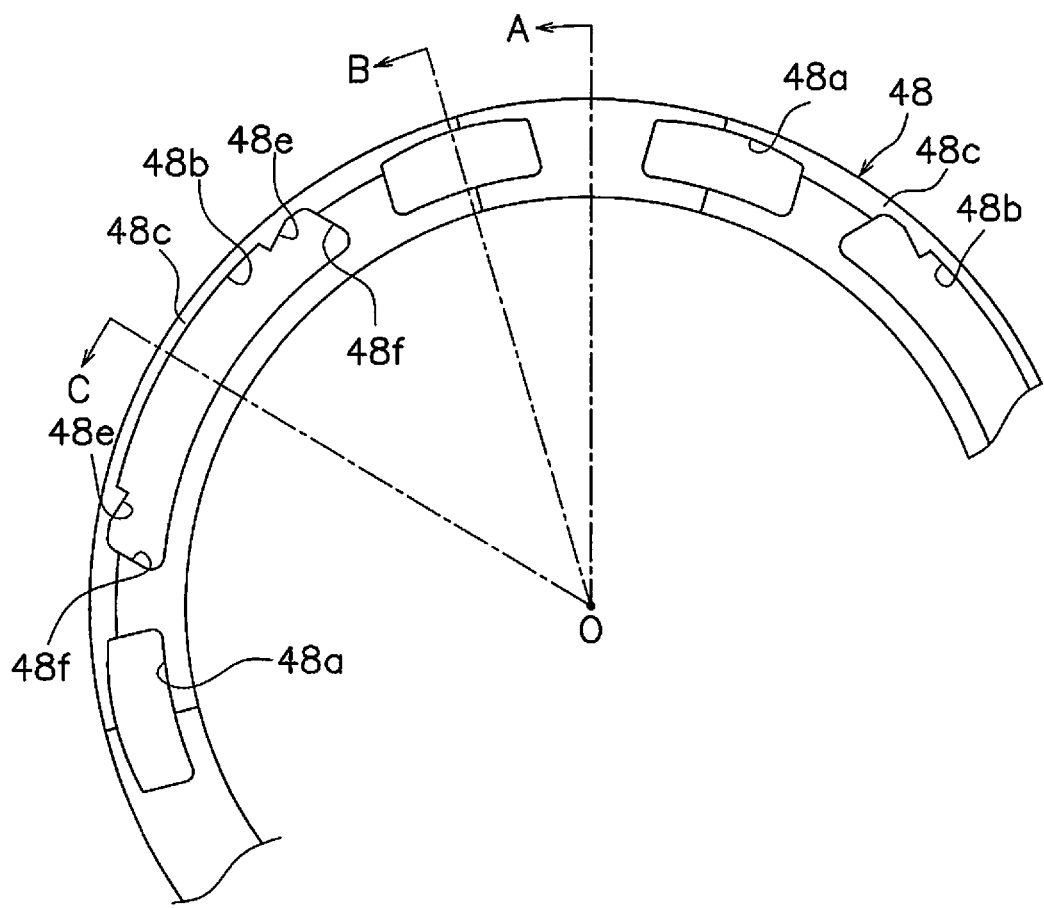
FIG. 7 is a front view of an inertia ring composing a part of the dynamic damper device in FIG. 3.
Figure 8C:
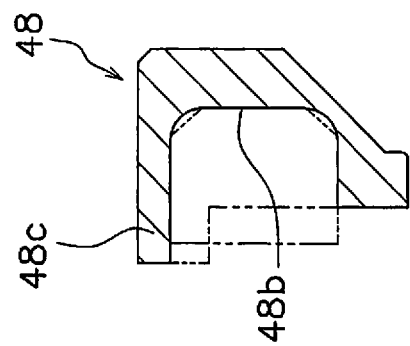
FIG. 8C is a cross-sectional view of FIG. 7 taken along line O-C.
Figure 8B:
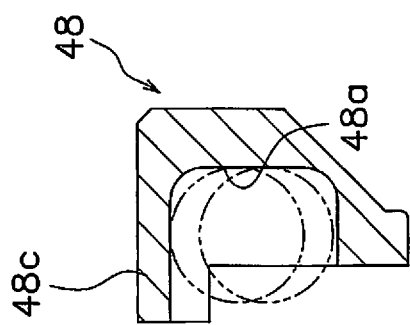
FIG. 8B is a cross-sectional view of FIG. 7 taken along line O-B.
Figure 8A:
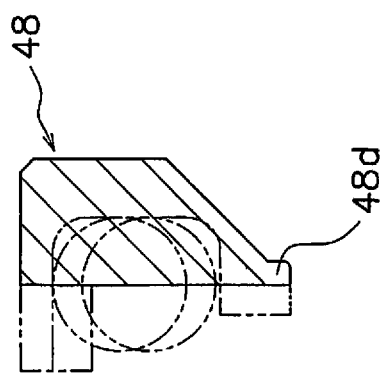
FIG. 8A is a cross-sectional view of FIG. 7 taken along line O-A.

FIG. 7 shows a partial front view of the inertia ring 48, whereas FIGS. 8A to 8C show cross-sections of FIG. 7 respectively taken along lines O-A, O-B and O-C. The inertia ring 48 is disposed to be rotatable relative to the damper plate 47. The inertia ring 48 is an annular member, and has a plurality of spring accommodation parts 48*a* and a plurality of slider accommodation parts 48*b*, both types of which are circumferentially aligned at predetermined intervals. The respective accommodation parts 48*a* and 48*b* are recessed parts formed to be axially opened toward the engine and recessed toward the transmission. Each of the plurality of slider accommodation parts 48*b* is disposed to be circumferentially interposed between two of the spring accommodation parts 48*a*.

Moreover, a plurality of protruding parts 48*c* is formed on the outer peripheral end of the inertia ring 48 such that each continues over a region corresponding to one slider accommodation part 48*b* and part of two spring accommodation parts 48*a* adjacent to the slider accommodation part 48*b*. The protruding parts 48*c* protrude axially toward the engine. Furthermore, as shown in FIG. 8, a restriction part 48*d* is formed on the inner peripheral end of the inertia ring 48 to protrude to the inner peripheral side. The side plate 51 contacts the restriction part 48*d* from the transmission side, and axial movement of the inertia ring 48 is thereby restricted. It should be noted that the side plate 51 is fixed at the inner peripheral part thereof to the first plate 44 of the intermediate member 34 together with the damper plate 47 by the stop pins 46.

As shown in FIG. 4, the plurality of torsion springs 49 are accommodated in the spring accommodation parts 48*a* of the inertia ring 48. Additionally, ends of the torsion springs 49 are engaged with both ends of each engaging part 47*c* of the damper plate 47. This results in a construction that the damper plate 47 and the inertia ring 48 are elastically coupled in the rotational direction by the torsion springs 49.

Figure 9:
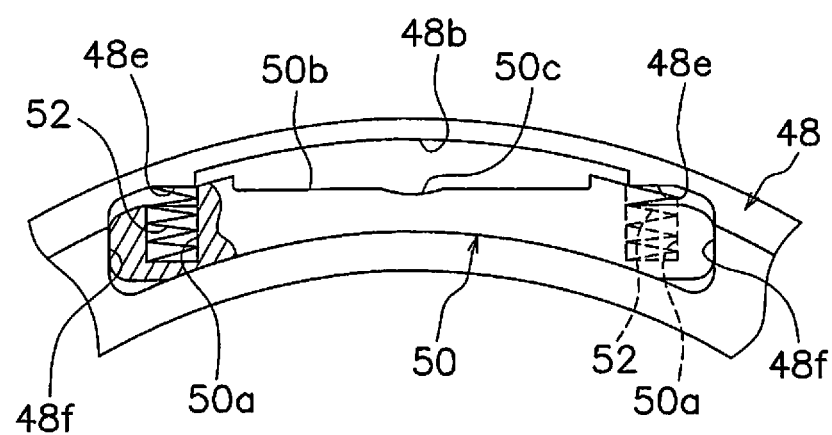
FIG. 9 is a partial enlarged view of FIG. 4.

As shown in FIG. 4, the sliders 50 are circumferentially elongated members, and are accommodated in the slider accommodation parts 48*b* of the inertia ring 48 to be radially movable. FIG. 9 shows the slider accommodation part 48*b* of the inertia ring 48 and the slider 50, which are extracted from the entire construction.

The slider accommodation part 48*b* has spring receiving parts 48*e* on the both circumferential ends thereof. Additionally, the both circumferential end walls of the slider accommodation part 48*b* function as guide parts 48*f*.

The slider 50 has spring accommodation parts 50*a* that are formed radially inward in both circumferential ends thereof. Moreover, a spring 52 is accommodated in each spring accommodation part 50*a* to urge the slider 50 to the inner peripheral side. Both lengthwise ends of the slider 50 slidably contact the guide parts 48*f* of the slider accommodation part 48*b*. Furthermore, an outer peripheral surface 50*b* of the slider 50 curves to be recessed inward. Additionally, a lock part 50*c*, to which the pawl 47*b* of the damper plate 47 is fitted, is formed on the circumferentially middle part of the outer peripheral surface 50*b*.

With the aforementioned construction, the pawls 47*b* of the damper plate 47, the sliders 50 and the springs 52 compose the hysteresis torque generating mechanism 53 that is configured to generate a variable hysteresis torque between the damper plate 47 and the inertia ring 48. It should be noted that in the hysteresis torque generating mechanism 53, the inertia ring 48, the torsion springs 49, the sliders 50 and the springs 52 function as an inertia member.

Action

First, an action of the torque converter body will be briefly explained. During rotation of the front cover 2 and the impeller 3, the operating oil flows from the impeller 3 to the turbine 4, and a torque is transmitted from the impeller 3 to the turbine 4 through the operating oil. The torque, transmitted to the turbine 4, is transmitted to the input shaft (not shown in the drawings) of the transmission through the turbine hub 17.

When the speed ratio of the torque converter 1 increases and the rotational speed of the input shaft reaches a predetermined speed, the operating oil in the space A is drained through the oil path formed inside the input shaft. As a result, the piston 30 is moved toward the front cover 2. Consequently, the friction facing 37 of the piston 30 is pressed onto the friction surface of the front cover 2, and the torque of the front cover 2 is outputted to the lock-up device 7.

In the lock-up device 7, the torque is sequentially transmitted to the piston 30, the drive plate 31, the outer peripheral side torsion springs 32, the intermediate member 34, the inner peripheral side torsion springs 33 and the driven plate 35 in this order, and is then outputted to the turbine hub 17.

In the lock-up device 7, the torque is transmitted, and also, variation in torque inputted thereto from the front cover 2 is absorbed and attenuated. Specifically, when torsional vibration occurs in the lock-up device 7, the outer peripheral side torsion springs 32 and the inner peripheral side torsion springs 33 are compressed in series between the drive plate 31 and the driven plate 35. Furthermore, similarly among the outer peripheral side torsion springs 32, those in each set are compressed in series. Due to this, the torsion angle can be widened. Additionally, the outer peripheral side torsion springs 32, allowed to extend a long circumferential distance, are caused to act in series. Hence, the torsion angle can be reliably widened as much as possible. This means that stiffness can be reduced as low as possible in torsional characteristics, and thus, vibration absorption and attenuation performance can be enhanced as much as possible.

Action of Dynamic Damper Device

The torque transmitted to the intermediate member 34 is transmitted to the driven plate 35 through the inner peripheral side torsion springs 33, and is further transmitted to a transmission-side member through the turbine hub 17. At this time, the dynamic damper device 36 is mounted to the intermediate member 34. Hence, variation in rotation of the engine can be effectively inhibited. In this regard, detailed explanation will be hereinafter described.

Figure 10:
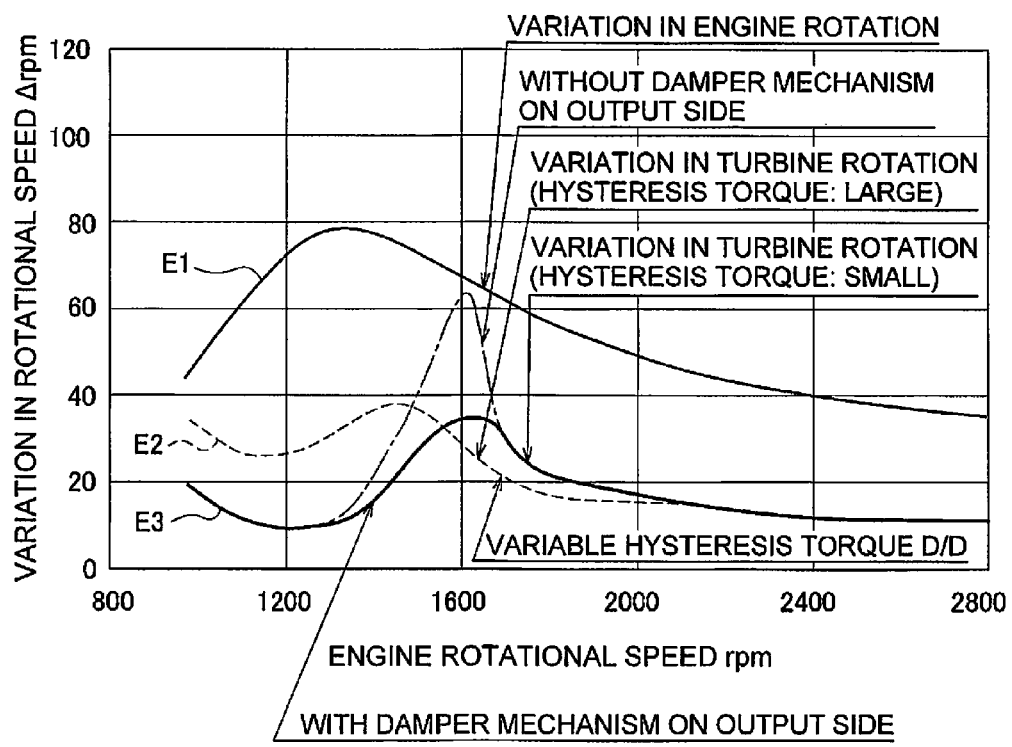
FIG. 10 is a characteristic diagram of engine rotational speed and variation in rotational speed.

As shown in FIG. 10, in general, when the engine rotational speed decreases, variation in rotation of the engine to be caused by variation in combustion increases (a characteristic E1). At this time, where the inertia ring 48 (i.e., the dynamic damper device 36) is not provided, variation in speed of rotation to be outputted from the torque converter gradually increases when the engine rotational speed decreases. By contrast, where the dynamic damper device 36 is provided as with the present exemplary embodiment, it is possible to reduce variation in rotational speed of the turbine as an output-side component at around a specific engine rotational speed (around 1200 rpm in the example of FIG. 10) (characteristics E2 and E3).

A difference between the characteristics E2 and E3 in a low rotational speed range is herein attributed to the magnitude of hysteresis torque in the hysteresis torque generating mechanism 53. Put differently, the characteristic E2 corresponds to a condition that the magnitude of hysteresis torque is relatively large, whereas the characteristic E3 corresponds to a condition that the magnitude of hysteresis torque is relatively small. In the characteristic E2, variation in rotational speed of the turbine decreases when the engine is rotated at around a rotational speed lower than 1200 rpm, is then maximized at around 1500 rpm, and gradually decreases in a rotational speed range higher than around 1500 rpm. On the other hand, in the characteristic E3, variation in rotational speed of the turbine indicates the minimum value smaller than that of the characteristic E2 around when the engine rotational speed exceeds 1200 rpm, and then, exceeds variation in rotational speed in the characteristic E2 and indicates the maximum value when the engine rotational speed is around 1600 rpm.

It should be noted that in the characteristic E3, a dashed dotted line indicates a condition that torsion springs serving as a damper mechanism are not mounted to the output side of a dynamic damper device, whereas a solid line indicates a condition that the torsion springs serving as the damper mechanism are mounted to the output side of the dynamic damper device.

As is obvious from these characteristics, in a low rotational speed range of the engine rotational speed, variation in rotational speed of the turbine is smaller when the magnitude of hysteresis torque is smaller, whereas in a middle rotational speed range, variation in rotational speed of the turbine is smaller when the magnitude of hysteresis torque is larger. In a high rotational speed range, variation in rotational speed of the turbine is less affected by the magnitude of hysteresis torque.

In view of the above, the hysteresis torque generating mechanism 53 according to the present exemplary embodiment is configured to make the hysteresis torque vary depending on the rotational speed ranges. Specifically, the magnitude of hysteresis torque to be generated by the hysteresis torque generating mechanism is small in the low rotational speed range of the engine rotational speed, and gradually increases in the middle and high rotational speed ranges.

Action of Hysteresis Torque Generating Mechanism

Using FIG. 11, explanation will be described for an action whereby hysteresis torque varies in accordance with the rotational speed ranges.

First, the magnitude of centrifugal force acting on the sliders 50 is relatively small in the low rotational speed range. Therefore, as shown in <Normal Condition> of FIG. 11A, each slider 50 is urged to the inner peripheral side by the urging force of the springs 52. When the dynamic damper device 36 is actuated in such a condition and the damper plate 47 and the inertia ring 48 are rotated relative to each other, each pawl 47b of the damper plate 47 is moved relative to each slider 50 on the outer peripheral side of the outer peripheral surface 50b of each slider 50.

At this time, each pawl 47b contacts the outer peripheral surface 50b of each slider 50, and thereby, an angular range of relative rotation of the damper plate 47 (torsion angle) is restricted. Furthermore, the torsion angle is maximized to θ1 in the low rotational speed range shown in FIG. 11A. In a torsion angular range of ±θ1, each pawl 47b is smoothly moved outside each slider 50, and thus, the magnitude of hysteresis torque is herein small.

When the rotational speed increases, the magnitude of centrifugal force acting on the sliders 50 increases. When a large centrifugal force acts on each slider 50, each slider 50 is moved to the outer peripheral side against the urging force of the springs 52 as shown in <Attenuated Condition> of FIG. 11B. In such a condition, each pawl 47b and the outer peripheral surface 50b of each slider 50 get closer, and the range that each pawl 47b is smoothly movable (torsion angle) becomes θ2, which is narrower than that in the low rotational speed range of FIG. 11A. Furthermore, in a torsion angular range of θ2 or greater, each pawl 47b strongly contacts the outer peripheral surface 50b of each slider 50, and hence, a hysteresis torque larger than that in the low rotational speed range is generated.

When the rotational speed then further increases, each slider 50 is moved to the further outer peripheral side against the urging force of the springs 52, and a condition as shown in <Locked Condition> of FIG. 11C is produced. In the condition, each pawl 47b is fitted to the lock part 50c of the outer peripheral surface 50b of each slider 50. Put differently, relative rotation between the pawls 47b (i.e., the damper plate 47) and the inertia ring 48 is prevented, and a locked condition is produced. Thus, in the condition shown in FIG. 11C, the hysteresis torque in the dynamic damper device 36 becomes infinite.

In the construction as described above, as shown in FIG. 10, the characteristic of variation in rotational speed of the turbine becomes the characteristic E3 in the low rotational speed range, and becomes the characteristic E2 in the middle to high rotational speed ranges. Therefore, variation in rotational speed of the turbine can be inhibited low over the entire engine rotational speed ranges.

A locking rotational speed, at which relative rotation between the damper plate 47 and the inertia ring 48 is prevented, can be herein set on the basis of the weight of constituent members including the inertia ring 48 and/or so forth. However, it can be assumed that an error in locking rotational speed occurs due to a manufacturing error and/or so forth. When an error in locking rotational speed occurs, variation in rotation attributed to secondary resonance cannot be effectively inhibited.

In view of the above, in the present exemplary embodiment, the dynamic damper device 36 is fixed to the intermediate member 34, and the inner peripheral side torsion springs 33 are mounted between the dynamic damper device 36 and the turbine hub 17 in order to inhibit vibration. As shown in FIG. 10 with comparison between the dashed dotted line and the solid line of the characteristic E3, a peak is lowered by the action of the inner peripheral side torsion springs 33, and thereby, increase in rotational variation can be inhibited even when an error in locking rotational speed occurs.

Second Exemplary Embodiment

Figure 12:
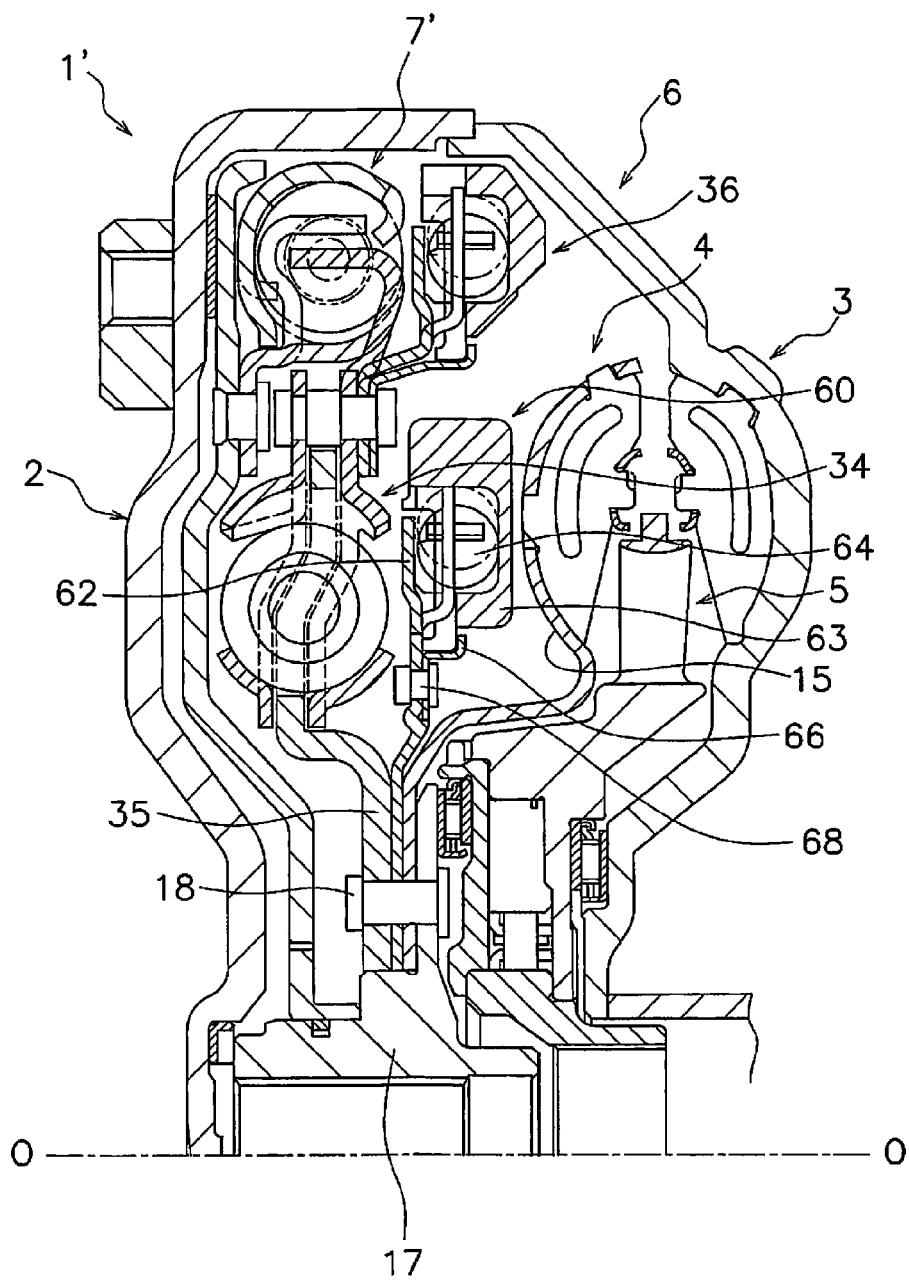
FIG. 12 is a diagram according to a second exemplary embodiment of the present invention and corresponds to FIG. 1.

FIG. 12 shows a torque converter 1' equipped with a lock-up device 7' according to a second exemplary embodiment of the present invention. In FIG. 12, similarly to FIG. 1, the engine is disposed on the left side, whereas the transmission is disposed on the right side. Additionally, a line O-O depicted in FIG. 12 indicates a rotational axis of the torque converter and the lock-up device 7'.

The construction of the second exemplary embodiment is obtained by mounting another dynamic damper device 60 to the turbine (the turbine hub) in addition to the construction of the first exemplary embodiment. Except for the above, the basic construction thereof is similar to that of the first exemplary embodiment, although specific shapes of components are different from each other. Therefore, the same reference signs will be assigned to members that are the same as those of the first exemplary embodiment, and explanation of the members will not be hereinafter described.

The output side dynamic damper device 60 is fixed to the turbine hub 17 together with the turbine shell 15 and the driven plate 35 by the rivets 18. Similarly to the dynamic damper device 36 fixed to the intermediate member 34, the output side dynamic damper device 60 includes a damper plate 62, an inertia ring 63, a plurality of torsion springs 64, a plurality of sliders (not shown in the drawing), a side plate 66 and springs (not shown in the drawing). The construction of the dynamic damper device 60 is similar to that of the first exemplary embodiment except for specific dimensions, including weight.

The damper plate 62 is fixed at the inner peripheral part thereof to the turbine hub 17 by the rivets 18, and the outer peripheral part thereof extends between the intermediate member 34 and the turbine 4. The inertia ring 63 is supported by the side plate 66, and is disposed between the intermediate member 34 and the turbine 4. The side plate 66 is fixed to the damper plate 62 by rivets 68, and as described above, supports the inertia ring 63. Furthermore, the sliders and the springs are not illustrated in FIG. 12, but are constructed similarly to those of the first exemplary embodiment except for dimensions and spring constants. Likewise, the hysteresis torque generating mechanism is also structured similarly to that of the first exemplary embodiment.

It should be noted that in the output side dynamic damper device 60 added anew to the second exemplary embodiment, a locking rotational speed is set to be higher than that set for the dynamic damper device 36 fixed to the intermediate member 34.

With the addition of the dynamic damper device 60 as described above, increase in rotational variation can be inhibited at a higher rotational speed. An increase in rotational variation attributed to high-mode resonance can be inhibited.

Other Exemplary Embodiments

The present invention is not limited to the exemplary embodiments as described above, and a variety of changes or modifications can be made without departing from the scope of the present invention.

In the aforementioned exemplary embodiments, respective two springs in the plurality of outer peripheral side torsion springs 32 and those in the plurality of inner peripheral side torsion springs 33 are configured to act in a series-like manner. However, the positional arrangements of the respective types of torsion springs are not limited to the above. Therefore, the float member 42 is not an essential component in the present invention.

In the aforementioned exemplary embodiments, the dynamic damper device is fixed to the intermediate member that couples the outer peripheral side torsion springs and the inner peripheral side torsion springs. However, the positional arrangement of the dynamic damper device is not limited to the above.

For example, the dynamic damper device may be fixed to the float member for causing respective two of the outer peripheral side torsion springs to act in a series-like manner. Alternatively, the dynamic damper device may be similarly fixed to a member for causing respective two of the inner peripheral side torsion springs to act in a series-like manner. In either of the constructions, occurrence of secondary resonance can be inhibited by disposing torsion springs as a damper mechanism on the output side of the dynamic damper device.

The lock mechanism can be omitted in the dynamic damper device by setting the stiffness of the inner peripheral side torsion springs as low as possible.

The construction for coupling the dynamic damper device to the intermediate member is not limited to those of the aforementioned exemplary embodiments. For example, teeth or pawls and cutouts or the like may be respectively formed in the intermediate member and a member composing a part of the dynamic damper device, and the both types of parts may be configured to be coupled.

The hysteresis torque generating mechanism is not limited to those of the aforementioned exemplary embodiments. Furthermore, the lock mechanism for preventing relative rotation between the damper plate and the inertia ring is also similarly not limited to those of the aforementioned exemplary embodiments.

In the aforementioned exemplary embodiments, the coil springs are used as the elastic members. However, elastic members made of another type of resin or so forth may be used instead.

In a lock-up device for a torque converter according to aspects of the present invention, it is possible to exert an effect of a dynamic damper device as effectively as possible by avoiding occurrence of secondary resonance in the dynamic damper device, inhibit variation in rotation, and especially, achieve low fuel consumption.

The invention claimed is:

1. A lock-up device for a torque converter mounted between a front cover coupled to an engine-side member and a turbine coupled to a transmission, comprising:
   an input rotary member into which a power is inputted;
   an output rotary member rotatable relative to the input rotary member and coupled to the turbine;
   a plurality of elastic members elastically coupling the input rotary member to the output rotary member in a rotational direction;
   an intermediate member configured to cause at least two of the plurality of elastic members to act in series, the intermediate member being rotatable relative to the input rotary member and the output rotary member; and
   a dynamic damper device directly coupled to the intermediate member and including a first inertia member.

2. The lock-up device for a torque converter recited in claim 1, wherein the plurality of elastic members include
   a plurality of first elastic members elastically coupling the input rotary member and the intermediate member in the rotational direction, and
   a plurality of second elastic members configured to act with the plurality of first elastic members in series through the intermediate member and elastically coupling the intermediate member and the output rotary member in the rotational direction.

3. The lock-up device for a torque converter recited in claim 2, wherein
   the plurality of first elastic members is disposed on an outer peripheral side of the plurality of second elastic members.

4. The lock-up device for a torque converter recited in claim 1, further comprising
   a clutch portion configured to transmit and block the power between the front cover and the input rotary member.

5. The lock-up device for a torque converter recited in claim 1, wherein
   the dynamic damper device includes a hysteresis torque generating mechanism, the hysteresis torque generating mechanism being configured to generate a first hysteresis torque in a low rotational speed range and generate a second hysteresis torque larger than the first hysteresis torque in middle to high rotational speed ranges.

6. The lock-up device for a torque converter recited in claim 3, wherein
   at least two of the plurality of first elastic members are configured to act in series.

7. The lock-up device for a torque converter recited in claim 3, wherein
   at least two of the plurality of second elastic members are configured to act in series.

8. The lock-up device for a torque converter recited in claim 1, wherein the hysteresis torque generating mechanism includes
   a slider configured to be rotated together with the inertia member, movable with respect to the inertia member in a radial direction, and having a slide surface extending in the rotational direction, and
   a contact member configured to be rotated together with the intermediate member, the contact member being configured to contact the slide surface of the slider such that a range of a torsion angle relative to the inertia member is restricted to a first angular range in the low rotational speed range, being configured to contact the slide surface of the slider such that the range of the torsion angle relative to the inertia member is restricted to a second angular range narrower than the first angular range in the middle rotational speed range including a rotational speed higher than a rotational speed in the low rotational speed range, and being configured to contact the slide surface of the slider such that torsion relative to the inertia member is prevented in the high rotational speed range including a rotational speed higher than the rotational speed in the middle rotational speed range.

9. The lock-up device for a torque converter recited in claim 8, wherein
the slider has a lock part to which the contact member is fitted, the lock part being formed on a middle part of the slide surface in the rotational direction.

10. The lock-up device for a torque converter recited in claim 1, further comprising
an output side dynamic damper device coupled to the turbine and including a second inertia member.

11. The lock-up device for a torque converter recited in claim 1, wherein
the dynamic damper device is fixed to the intermediate member by a rivet.

12. The lock-up device for a torque converter recited in claim 3, wherein
the dynamic damper device is coupled to the intermediate member on an outer peripheral side of the plurality of second elastic members.

13. The lock-up device for a torque converter recited in claim 10, wherein
the output side dynamic damper device is coupled to the turbine on an inner peripheral side of the plurality of second elastic members.

14. The lock-up device for a torque converter recited in claim 3, further comprising
a clutch portion configured to transmit and block the power between the front cover and the input rotary member.

15. The lock-up device for a torque converter recited in claim 14, wherein
the dynamic damper device includes a hysteresis torque generating mechanism, the hysteresis torque generating mechanism being configured to generate a first hysteresis torque in a low rotational speed range and generate a second hysteresis torque larger than the first hysteresis torque in middle to high rotational speed ranges.

16. The lock-up device for a torque converter recited in claim 6, wherein
at least two of the plurality of second elastic members are configured to act in series.

17. The lock-up device for a torque converter recited in claim 16, wherein the hysteresis torque generating mechanism includes
a slider configured to be rotated together with the inertia member, movable with respect to the inertia member in a radial direction, and having a slide surface extending in the rotational direction, and
a contact member configured to be rotated together with the intermediate member, the contact member being configured to contact the slide surface of the slider such that a range of a torsion angle relative to the inertia member is restricted to a first angular range in the low rotational speed range, being configured to contact the slide surface of the slider such that the range of the torsion angle relative to the inertia member is restricted to a second angular range narrower than the first angular range in the middle rotational speed range including a rotational speed higher than a rotational speed in the low rotational speed range, and being configured to contact the slide surface of the slider such that torsion relative to the inertia member is prevented in the high rotational speed range including a rotational speed higher than the rotational speed in the middle rotational speed range.

18. The lock-up device for a torque converter recited in claim 9, further comprising
an output side dynamic damper device coupled to the turbine and including a second inertia member.

19. The lock-up device for a torque converter recited in claim 18, wherein
the dynamic damper device is fixed to the intermediate member by a rivet.

20. The lock-up device for a torque converter recited in claim 12, wherein
the output side dynamic damper device is coupled to the turbine on an inner peripheral side of the plurality of second elastic members.

\* \* \* \* \*